United States Patent [19]

Prillard

[11] Patent Number: 5,184,867
[45] Date of Patent: Feb. 9, 1993

[54] SUN-VISOR WITH COVERING AND SUPPORTING ARM

[75] Inventor: Charles B. Prillard, Rupt, France

[73] Assignee: Rockwell Automotive Body Systems-France, Paris la Defense, France

[21] Appl. No.: 827,614

[22] Filed: Jan. 29, 1992

[30] Foreign Application Priority Data

Jan. 31, 1991 [FR] France ................... 91 01118

[51] Int. Cl.⁵ .............................................. B60J 3/02
[52] U.S. Cl. ................................. 296/97.9; 296/97.1
[58] Field of Search ............... 296/97.9, 97.1, 97.11, 296/97.12

[56] References Cited

U.S. PATENT DOCUMENTS 4,679,843  7/1987  Spykerman ............... 296/97.9 X
4,953,064  8/1990  Viertel et al. .............. 296/97.9 X

FOREIGN PATENT DOCUMENTS 3008361  9/1981  Fed. Rep. of Germany ..... 296/97.1
3601761  4/1987  Fed. Rep. of Germany ..... 296/97.1
8300846  3/1983  World Int. Prop. O. ......... 296/97.9

Primary Examiner—Charles A. Marmor
Assistant Examiner—Joseph D. Pape
Attorney, Agent, or Firm—Notaro & Michalos

[57] ABSTRACT

The present invention relates to a sun-visor for motor-vehicle, of the type comprising a light screening body having an indentation on one of its edges, a supporting arm traversing the indentation and a covering over the body. The body has two end portions of a rod which extend in opposite directions include the indentation and coaxially to the supporting arm. A mechanism for fixing the supporting arm on the body is constituted by the end portions of the rod which cooperate with recesses provided in the supporting arm and issuing onto the end faces of the arm. The parts of the coating situated in the immediate vicinity of the end portions of the rod are interposed between the end faces of the supporting arm and the light screening body.

4 Claims, 3 Drawing Sheets

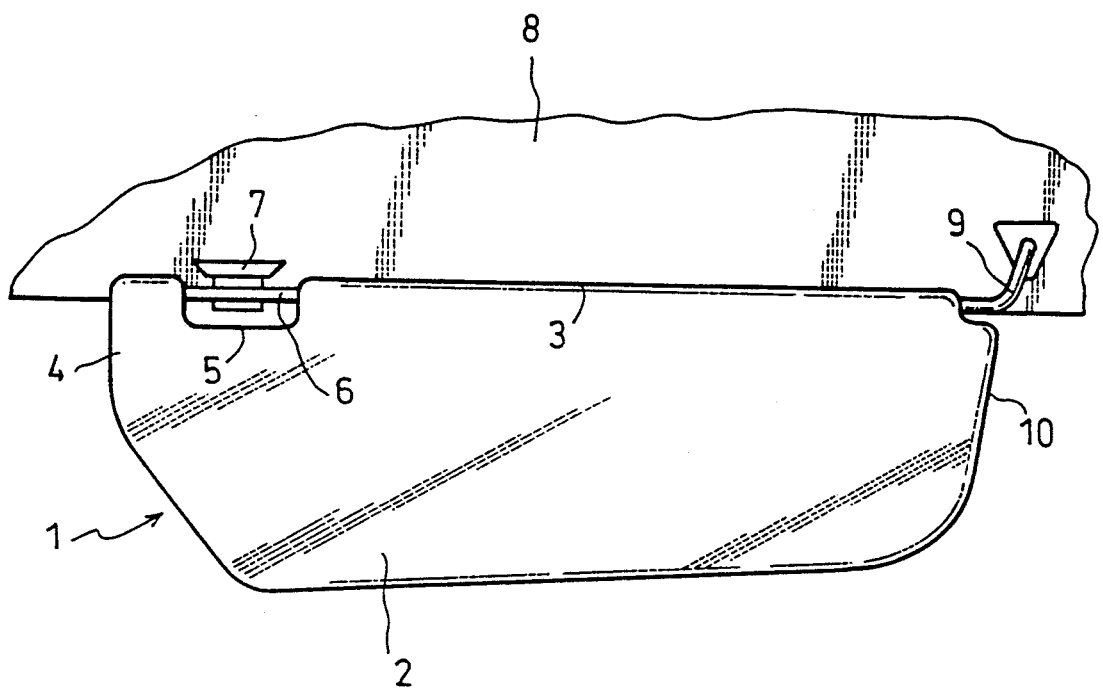
fig_1

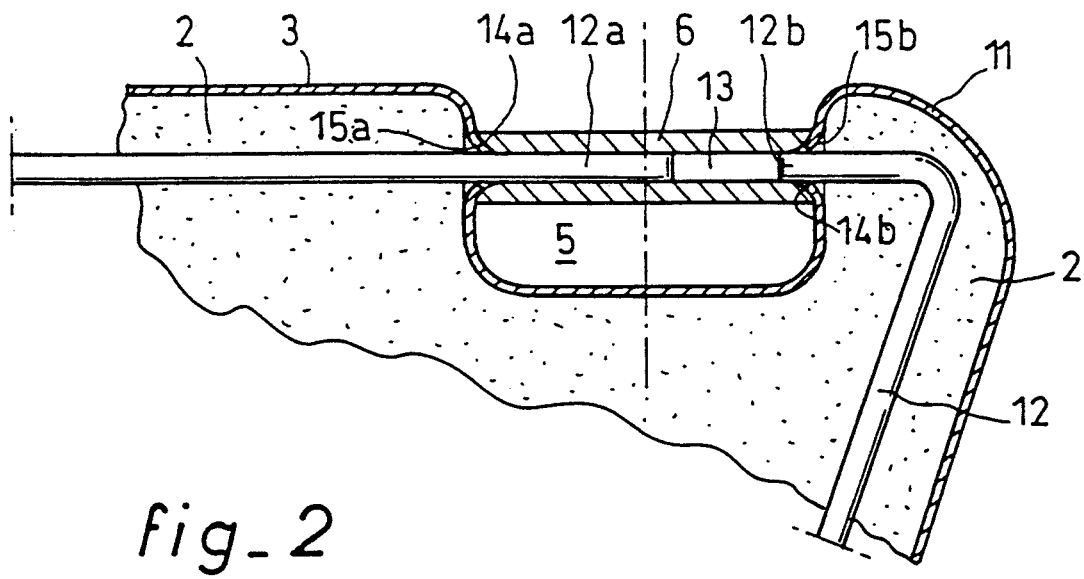
fig_2
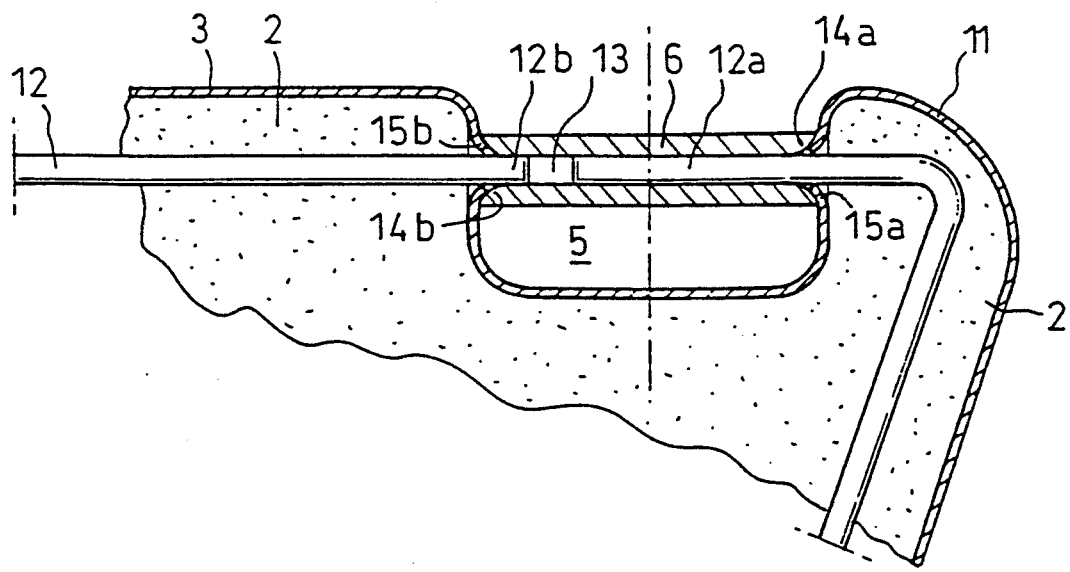
fig_3

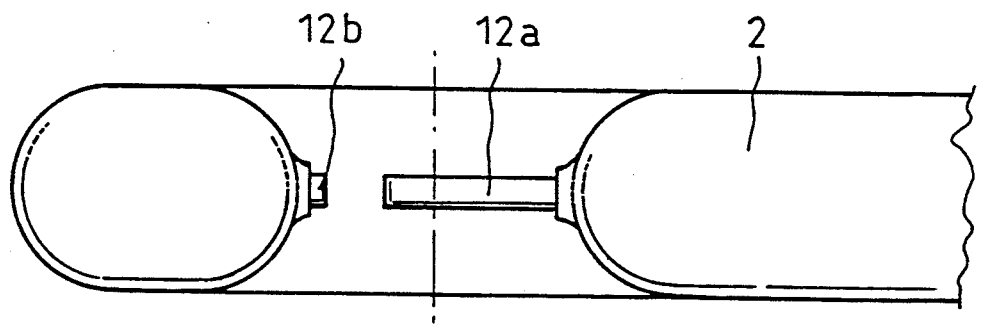
fig_4
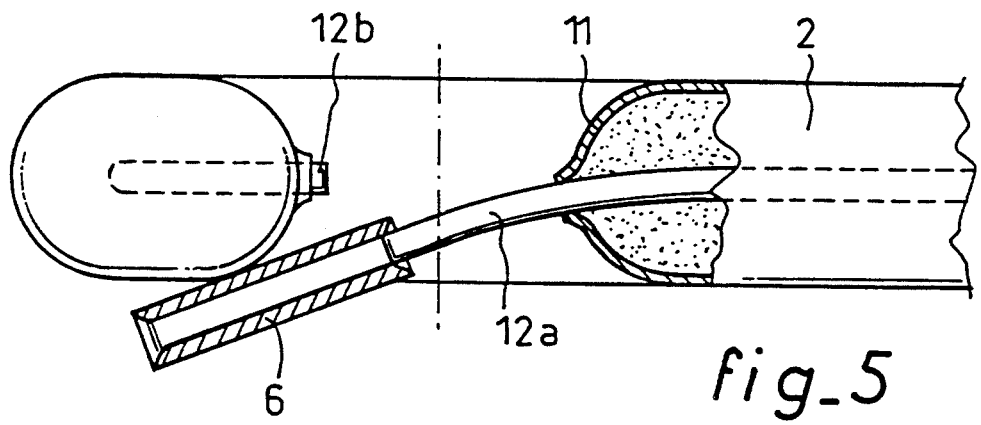
fig_5
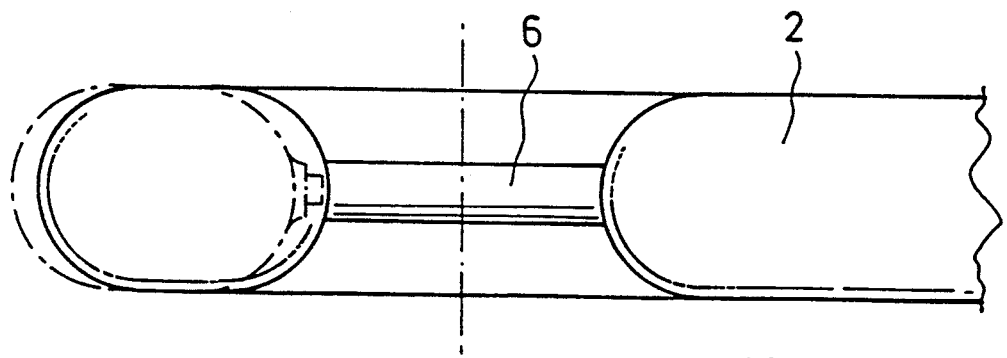
fig_6

SUN-VISOR WITH COVERING AND SUPPORTING ARM

FIELD OF THE INVENTION

The present invention relates to a sun-visor for a motor-vehicle, of the type comprising a screen having an indentation on one of its edges, a supporting arm traversing said indentation and a covering over said screen, said supporting arm being fixed to said screen via fixing means and being designed to cooperate temporarily with fastening means fixed to the vehicle roof on which said sun-visor is mounted.

Conventionally, the sun-visor is joined to the vehicle roof via a bent lug allowing it to pivot, on the one hand, about a substantially vertical lateral axis and, on the other hand, about a horizontal axis. It is necessary, in order to improve the positioning of the sun-visor inside the vehicle, to clip it onto a hook fixed in the center of the roof. To this effect, the sun-visor is equipped with a supporting arm, or an endpiece, adapted to cooperate with said hook in such a way that the latter can pivot about said supporting arm.

BACKGROUND OF THE INVENTION

Difficulties have been met for mounting the supporting arm when the sun-visor is covered over, in particular with plastic material. The covering is generally obtained by sealing the edges of two covering sheets applied on either side of the light screening body, along the periphery of the body.

According to a conventional production method, the supporting arm is constituted by a spindle fixed to the light screening body which is covered over with plastic material, during the screen covering operation. The spindle can have a section adapted to compensate for the thickness of the sealing line and to prevent any shifting of the covering when pivoting the sun-visor. It is however impossible, with this particular embodiment, to control the diameter of the supporting arm and the cooperation with the hook of the vehicle roof can cause, with time, tearing of the covering on the spindle.

It has been proposed, in order to overcome this difficulty, to remove the part of the covering which is around the spindle by providing circular notches near the edges of the indentation. But such cuts are always visible and unsightly, particularly when the covering is not made with a homogeneous material.

It has also been proposed to produce the supporting arm by means of two half-shells which are mounted on a rod made fast with the light screening body after the covering operation.

It is also known to use a method for mounting the supporting arm whereby the cuts made in the coating close to the edges of the supporting arm are invisible. This method consists in forcing back the parts of the covering around the cuts into the screening body of the sun-visor. But the supporting arm is more delicate to produce, since the cuts must be concealed on both sides of the indentation. The technique currently used consists in fixing the supporting arm on an added part which is fitted on one side of the indentation in a recess provided to this effect so as to press the covering into the sun-visor, as well as in the other side, in the opposite direction, to conceal the second cut. The problem with this technique is that it requires expensive tools and a long fitting time. Indeed, the sun-visor must be twisted in order to force-fit the added part into the cavity provided to this effect. What is more, this method does not permit the construction of thin screens.

SUMMARY OF THE INVENTION

It is the object of the invention to provide a sun-visor of the aforementioned type in which the supporting arm is easy to mount, which permits the use of a thin light screening body and which is not unsightly.

The object of the present invention is reached in that the body comprises two end portions of rod extending in opposite directions in the indentation and coaxially to said supporting arm, in that the means for fixing said supporting arm to said light screening member are constituted by said end portions of rod which cooperate with recesses provided in said supporting arms and issuing into the end faces of the latter, and in that the parts of the covering situated in the immediate vicinity of said end portions of rod are interposed between the end faces of the light supporting arm and said screening body.

BRIEF DESCRIPTION OF THE DRAWINGS

The invention will be more readily understood on reading the following description given by way of example with reference to the accompanying drawings, in which:

FIG. 1 shows a sun-visor fixed to the roof of a motor-vehicle,

FIG. 2 shows a median section of the part of the sun-visor situated close to the supporting arm;

FIG. 3 shows a variant embodiment of FIG. 2, and

FIGS. 4 to 6 show the different steps in the production of the sun-visor according to the invention.

DESCRIPTION OF THE PREFERRED EMBODIMENT

Referring now to the drawings, these show a sun-visor for motor-vehicles comprising a light screening body 2 having, on one of its longitudinal edges 3 and close to one of its ends 4, an indentation 5 in which is provided a supporting arm 6 substantially parallel to the longitudinal edge 3 and adapted to cooperate with a hook 7 fixed to the vehicle roof 8.

The sun-visor 1 is joined to the vehicle roof 8 by means of a bent lug 9 disposed on the other side 10 of the body 2 in such a way that it can pivot about a substantially vertical lateral axis and about a horizontal axis coaxial to the supporting arm 6.

The light screening body 2 is preferably made of a flexible material, and it is covered over with a covering 11, which may be a plastic material, such as for example, polyvinylchloride, or a fabric. The body 2 is produced, in conventional manner, either by molding or by injection of a foam. It comprises an armature, in the form of a rod 12 of flexible material, embedded in the foam and having two end portions 12a and 12b, which extend in opposite directions in the indentation 5 and coaxially to the supporting arm 6. Arm 6 is constituted of a tube having a bore 13 of diameter equal to the diameter of the end portions 12a and 12b of the rod 12, and extending onto the two end faces 14a and 14b of the supporting arm 6. The two end faces 14a and 14b have concave surfaces so as to grip the parts 15a and 15b of the covering 11 which surround the end portions 12a and 12b, between the end faces 14a and 14b of the supporting arm 6 and the body 2.

As illustrated in the drawings, the length of one of the end portions, for example 12a, is greater than half the width of the indentation 5. The other end portion 12b is relatively short, yet of sufficient length to be housed in the bore 13 and to hold one end of the supporting arm 6.

The rod 12 and the bore 13 can have circular cross-sections, or these can be non-circular and complementary to prevent the rotation of the supporting arm 6 on the end portions 12a and 12b of the rod. If the rod 12 and the bore 13 have circular sections, means are advantageously provided for preventing the rotation and shifting of the supporting arm 6. Said means can consist of bosses or flat surfaces, so that the supporting arm 6 can be clipped over the rod 12. Said bosses and flat surfaces are advantageously obtained by crushing the rod 12.

The sun-visor 1 is produced as described below:

The light screening body 2 is produced by molding a foam material over the rod 12. The body, with end portions 12a and 12b fitted in its indentation 5, is covered with a covering 11, for example by applying two PVC sheets on either side of body 2 and sealing them together along the periphery of the body. The parts of the covering which cover partly the end portions 12a and 12b are then removed. The end portion 12a is bent so that it can be fitted into the bore 13 of the supporting arm 6, as illustrated in FIG. 5. Due to the elasticity of the foam forming the body and of the armature constituted by the rod 12, the end portion 12b is introduced into the bore 13 merely by deforming the body 2.

The invention is not in any way limited to the description given hereinabove, on the contrary, a number of modifications can be brought thereto by the man skilled in the art, without departing from its scope.

I claim:

1. Sun-visor for motor vehicles comprising:
   a sun-visor body made of foam and having an edge with an indentation therein, a supporting arm transversing said indentation and a covering which covers said sun-visor body;
   a rod made of a flexible material in said body and having two end portions extending in opposite directions in said indentation and coaxially to said supporting arm;
   said supporting arm comprising an unsplit tube having two end faces and a bore into which said end portions of said rod are fitted;
   said covering having parts surrounding said end portions of said rod which are gripped between said end faces and said sun-visor body;
   said end portions being structured so that said supporting arm is mounted on said end portions of said rod, after covering said sun-visor body by said covering, by first bending one of said end portions and fitting said one end portion into said bore, and then by deforming the sun-visor body and introducing the second of said end portions into said bore.

2. Sun-visor as claimed in claim 1, wherein the length of one of said end portions is greater than half the width of said indentation.

3. Sun-visor as claimed in claim 1, wherein the end faces of said supporting arm have concave surfaces.

4. Sun-visor as claimed in claim 3, wherein the length of one of said end portions is greater than half the width of said indentation.

* * * * *